United States Patent [19]

Suzaki

[11] 3,895,544

[45] July 22, 1975

[54] POWER TRANSMISSION DEVICE BETWEEN A PLURAL NUMBER OF ROTORS OF CINEPROJECTORS

[75] Inventor: Kuniyoshi Suzaki, Tokyo, Japan

[73] Assignee: Canon Kabushiki Kaisha, Tokyo, Japan

[22] Filed: June 22, 1973

[21] Appl. No.: 372,762

[30] Foreign Application Priority Data
June 29, 1972 Japan................................ 47-65360

[52] U.S. Cl... 74/242.15 R; 74/242.11 R; 74/216.5; 242/205
[51] Int. Cl............................ F16h 7/08; F16h 7/12
[58] Field of Search... 74/242.15 R, 242.1 R, 242.9, 74/242.11 R, 216.5; 242/205, 75.3, 75.47, 75.5, 201, 205

[56] References Cited
UNITED STATES PATENTS

| | | | |
|---|---|---|---|
| 1,257,660 | 2/1918 | Willis | 74/242.9 |
| 1,912,153 | 5/1933 | Monson et al. | 242/205 |
| 2,632,335 | 3/1953 | Ciaccio | 74/242.1 R |
| 2,953,028 | 9/1960 | Staak | 74/242.11 R |
| 3,262,330 | 7/1966 | Cheatum | 74/242.11 R |
| 3,630,467 | 12/1971 | Hayami | 242/205 |
| 3,643,894 | 2/1972 | Kadowaki | 242/205 |
| 3,643,896 | 2/1972 | Kadowaki | 242/205 |
| 3,658,276 | 4/1972 | Hayami | 242/205 |
| 3,665,780 | 5/1972 | Lunenschloss | 74/242.9 |
| 3,741,499 | 6/1973 | Osborn | 74/242.15 R |

Primary Examiner—Samuel Scott
Assistant Examiner—Allan R. Burke
Attorney, Agent, or Firm—Fitzpatrick, Cella, Harper & Scinto

[57] ABSTRACT

This invention relates to a power transmission device between a plural number of rotors stretched like an endless band between a plural number of rotors of cineprojector etc. there are provided a plural number of rotors rotated and driven by said endless band-form body, a driving means to drive said endless band-form body, and means to adjust the related band-form body by responding to the direction and magnitude of the endless band-form body driving power caused by said driving means. Said endless band-form body is stretched by above-mentioned band-form body adjusting means to remove the slackness of the band-form body when transmitting power to the endless band-form by above-mentioned driving means.

16 Claims, 6 Drawing Figures

POWER TRANSMISSION DEVICE BETWEEN A PLURAL NUMBER OF ROTORS OF CINEPROJECTORS

BACKGROUND OF THE INVENTION

1. Field of the Invention

This invention relates to a power transmission device between a plural number of rotors of cineprojector etc., and more particularly to a power transmission device between a plural number of rotors of cineprojector having means to tension an endless band-form body when driving the rotors by said endless band-form body.

2. Description of the Prior Art

Up to the present, a plural number of rotors of cineprojector etc. have been driven by an endless band-form body such as, belt or chain, stretched between them to travel a fine band body such as the cine film. Especially, in equipment such as a cineprojector, the method in which the reel spindles, which respectively support the supply reel and take-up reel rotatable, are driven by an endless belt or chain and the power is transmitted to either one of both spindles by the clutch mechanism which is provided to be engageable to each reel spindle by changing the driving direction, is generally employed.

In this case, the spindle disengaged from the clutch and free of reel load and the other spindle to which reel load is effected through the clutch are driven by the driving means by way of a belt or chain. And, depending on the direction of the rotation of the driving means, the tight side and slackened side of the belt or chain are produced on both sides of the driving means.

The production of such slackening may cause the belt or chain to vibrate or may generate unstable power transmission. Moreover, after being used for a long period of time, the belt etc., will accompany with elongation and the above-mentioned unstable operation will become so intense as to produce noise and to hinder the use.

SUMMARY OF THE INVENTION

The first object of this invention is to provide a power transmission device between a plural number of rotors which enables to remove the slackening of a band-form body generated when the plural number of rotors are rotated and driven by single driven means.

The second object of this invention is to provide a power transmission device between a plural number of rotors which has a band-form body adjusting means capable of removing the slackening of the band-form body generated when the plural number of rotors are rotated and driven by a single driving means.

The third object of this invention is to provide a power transmission device between a plural number of rotors which has a band-form body adjusting means capable of removing the slackening of the band-form body generated when the plural number of rotors are rotated and driven by a single driving means as well as capable of responding to the running direction of said band-form body.

The fourth object of this invention is to provide a power transmission device between a plural number of rotors which has a band-form body adjusting means capable of removing the slackening of the band-form body generated when rotating and driving the band-form body by a single driving means and of responding to the magnitude of the slackening of said band-form body.

DESCRIPTION OF THE PREFERRED EMBODIMENT

Figure 1:
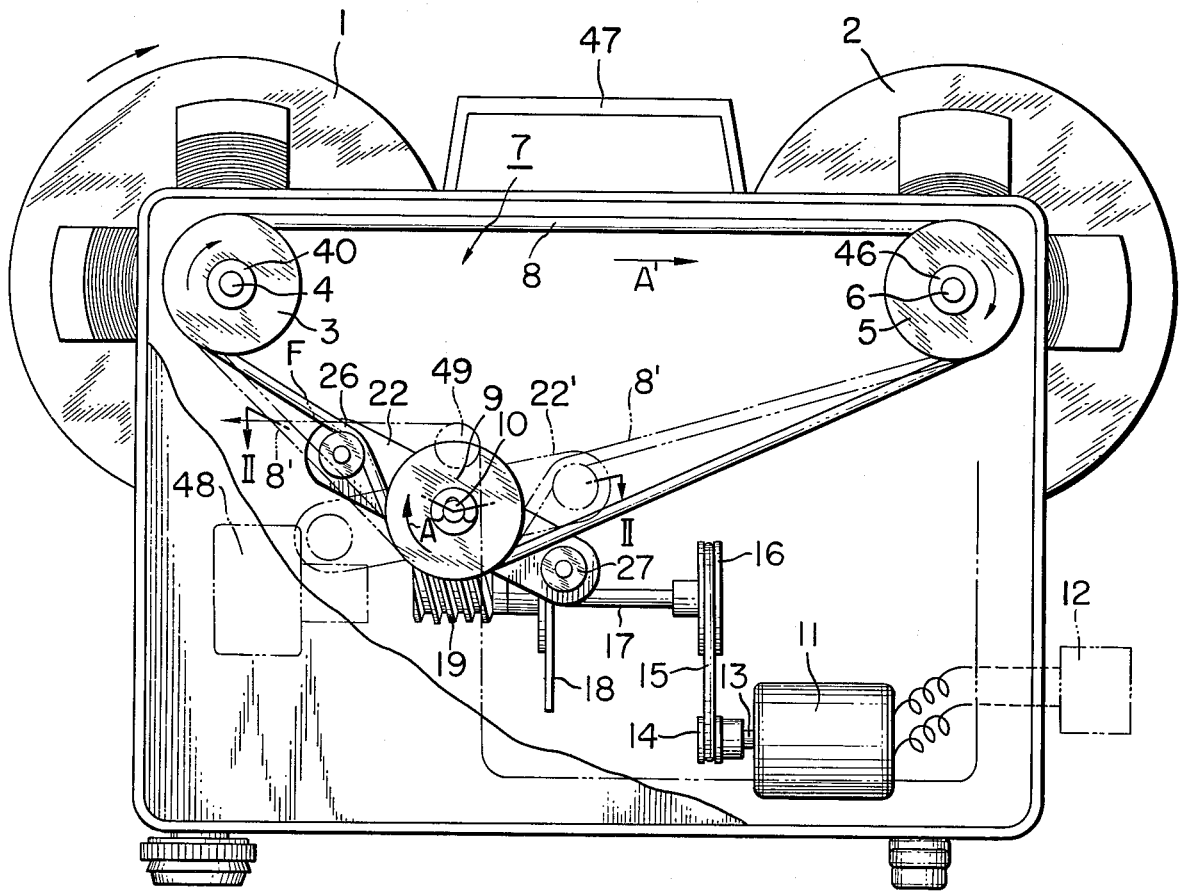
FIG. 1 is a partly broken front view illustrating the essential composition of a cineprojector to which the power transmission device between a plural number of rotors of cineprojector etc. according to this invention is applicable.

FIG. 1 shows the main components on the back of a cineprojector to which one embodiment of the device according to this invention has been applied.

In FIG. 1, 1 is a supply reel and 2 is a take-up reel. The driven pulleys 3 and 5 are supported rotatively to the main unit 7 by the shafts 4 and 6 in order to rotate and drive the reel spindle 44 (FIG. 5) which bears these reels. Between these pulley shafts 4 and 6 and reel spindle 44 is provided a clutch mechanism (FIG. 5) in such a way that the rotation of the pulleys 3 and 5 can be transmitted to the reel spindle or the transmission can be cut off by the engagement or disengagement of the clutch. The clutch mechanism will be described later. A drive pulley 9 is rotatable around a shaft supported by the body. Between said drive pulley 9 and the above-mentioned driven pulleys 3 and 5 an endless belt 8 is stretched, thereby the driving force from the driving means described later can be transmitted to the driven pulleys 3 and 5. In the drawing, 11 is a reversible motor, 12 is a switching means for switching over forward and reverse motions of the motor 11, 13 is an output shaft of said motor, 14 is a pulley mounted to said shaft 13, 15 is a driving belt stretched between said pulley and the second pulley 16, 17 is a main shaft which rotates together with said second pulley, 18 is a shutter integrally mounted to said main shaft, 19 is a worm which rotates together with the main shaft.

The driving means described so far is a conventional means, and 47 is a handle mounted to the main unit 7, 48 is a projecting optical system, and 49 is a guide roller. The state in which the worm 19 shown in FIG. 1 and the driving pulley 9 are connected is well understood by the cross section shown in FIG. 2. A worm gear 20 engages said worm 19 and is fixed to the driving pulley 9 by a small screw 21. An element 22 adjusts the band-form body such as the belt 8 and is supported between the driving pulley 9 and worm gear 20 by a coil spring 23 and friction element 24 made of felt etc.

Figure 2:
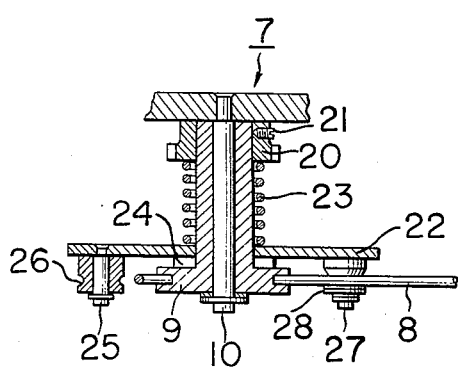
FIG. 2 is a cross section viewed in the direction of arrow mark along the line II—II of FIG. 1.

Accordingly, since this adjusting element 22 is pushed down to the lower side in FIG. 2 by the coil spring and pressed against the boss of the driving pulley 9 by way of the friction element 24, the rotating and driving force of the driving pulley 9 is so set as to be transmitted to said adjusting element by friction.

On this adjusting element, rollers 26 and 28, which are rotatably supported by the shafts 25 and 27 planted on said adjusting element 22, are mounted at approximately symmetrical positions with respect to the driving pulley shaft 10.

Figure 5:
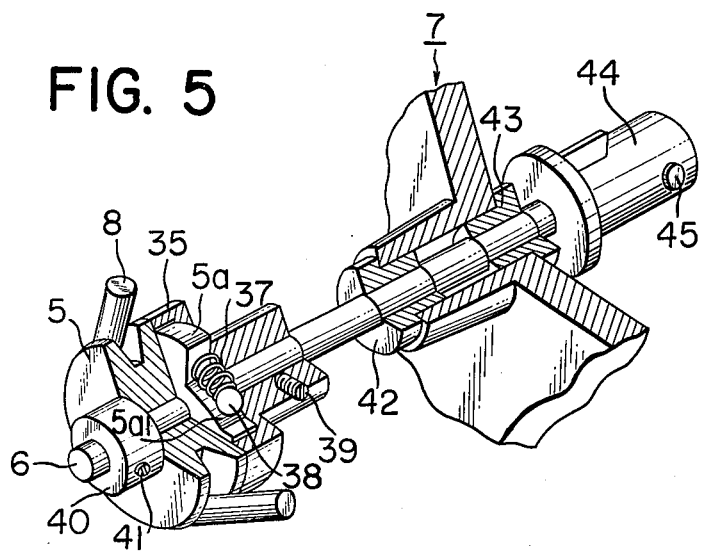
FIG. 5 is a front view illustrating the essential composition of tape recorder to which the power transmission device between a plural number of rotors according to this invention is applicable.

The take-up reel 3 side of the previously mentioned clutch mechanism is shown in detail in FIG. 5. The shaft 4 is supported rotatively by the main unit 7 by way of metals 42 and 43. The reel spindle 44, clutch outer ring 35, and thrust removing element 40 are fixed to said shaft 4 by set screws 45, 39 and 41 respectively.

The above-mentioned driven pulley 5 forms a cam section 5a as a part of one body.

Said cam section 3a is provided with a notched section $5a_1$, which accommodates the spring 37 and ball 38, and the clutch outer ring 35 is so arranged as to cover said can section 5a. Said notched section $5a_1$ takes a curve form which is broaden outward in clockwise direction and the cam section 5a is of a form which is constricted toward the direction of the shaft 4.

The inner surface of the clutch outer ring 35 arranged to cover said cam section 5a takes the form of being raised toward the direction of shaft 6 to correspond to said cam section 5a and, when said pulley 5 is rotated clockwise by the belt 8, the ball 38 is moved outward of the notched section 5a, and made to slide so that said ball 38 does not transmit the driving force to the clutch outer ring 35. When said pulley 5 is rotated counterclockwise, the ball 38 is moved toward the inside of the notched section $5a_1$, held between the clutch outer ring 35 and the pulley 5, and as a result transmits the driving force of the pulley 5 to the clutch outer ring 35.

In the case of the clutch mechanism on the side of take-up reel 3, the notched section takes a curve form which broadens outwardly in the counterclockwise direction. The operation is the same as before. Next, operation of power transmission device having said construction will be described.

At the time of rewinding film

Assume that the film projection has been ended and the film is in the process of being rewinded, and that the film is being rewinded from the take-up reel by the rotation of supply reel 7 in the direction of arrow. The motor 11 is then put in reverse run by the switching means 12, the driving force of the motor 11 is transmitted to the main shaft 17 by the belt 15 to run the worm 19 in reverse direction, thereby rotating the driving pulley 9 in the direction of arrow mark A in the drawing by way of the worm gear 20. Accordingly, the belt 8 is driven in the direction of arrow mark A' and the driven pulleys 3 and 5 are rotated in the direction of arrow in the drawing. At this time, by the clutch mechanism of common knowledge and by its operating means, the shaft 4 of the driven pulley 3 is being connected to the spindle of supply reel 1 and the reel 1 is being rotated and driven in the direction of the arrow. However, since the shaft 6 of the driven pulley 5 is being disengaged from the spindle of the take-up reel 2 by the clutch 4, said driven pulley 5 does not drive the reel 2 but rotates freely. The reel 2 is made to rotate by the tension of the film itself which is taken up by the rotation and driving of film supply reel. In this way the film is rewinded from the take-up reel 2 to the supply reel 1 as shown by the alternate long and two short dashed line F of the drawing.

In this rewinding process, the driven pulley 5 has a light load since the connection between it and the reel 2 is cut off. However, the driven pulley 3 has a relatively heavy load since it is connected to the reel 1. Therefore, the belt 8 between the driving pulley 9 and the driven pulley 5 is tightened, but the belt 8 between the driving pulley 9 and the driven pulley 3 has a slackening. In order to remove this slackening, when the driving pulley 9 rotates as shown by the arrow mark A, the previously mentioned band-form body adjusting element 22 rotates, with the cooperation of the spring 23 and the friction element 24, in the same direction as the rotating direction of said driving pulley 9 to press the belt 8, which is liable to slacken, with the roller 26 and supplies the belt 8 with a tension sufficient to remove the slackening. In this case, the belt 8 is displaced slightly from the position 8' shown by the alternate long and two short dashes line to the inner side between pulleys as shown in the drawing. The amount of this displacement is determined by the amount of the rotation of the adjusting element 22. On the other hand, the amount of the rotation of the adjusting element 22 is held at a position where the factors such as the friction force caused by the spring 23 and the friction element 24, the turning effect of the driving pulley 9, and the drag applied from the belt to the adjusting element 22 by way of the roller 26 are in equilibrium. In this way the slackening produced during rewinding period can be removed. The same applies to the case of reverse run projection.

At the time of forward run projection of the film

Next, when the film is projected on the screen in normal way, the motor 11 runs forward by the switching means 12 and, at the same time, the clutch mechanism is also switched, and, as a result, the connection between the reel spindle of the supply reel 1 and the driven pulley 3 is cut off, and the reel spindle of the take-up reel 2 and the driven pulley 2 are driven and connected. Accordingly, the film travels from the supply reel 1 in the direction reverse to the direction shown by the arrow mark F.

At this time, the driving pulley 9, which forms a power transmission device, is rotated by the motor 11 in the direction opposite to the arrow mark A, and the driven rollers 3 and 5 are rotated and driven by the belt 8 in the direction opposite to the arrow mark.

In this case, although the belt between the driving pulley 9 and the driven pulley 5 is tend to slacken depending on the weight of the load, the previously mentioned adjusting element 22 rotates counterclockwise in response to the turning effect of the driving pulley 9 as shown in FIG. 1 by way of the friction means 23 and 24 and, in order to remove the slackening of the belt 8, presses the belt 8 with the roller 28. The positions of the adjusting element 22' and the belt 8' are shown by the alternate long and two short dashes line.

Figure 3:
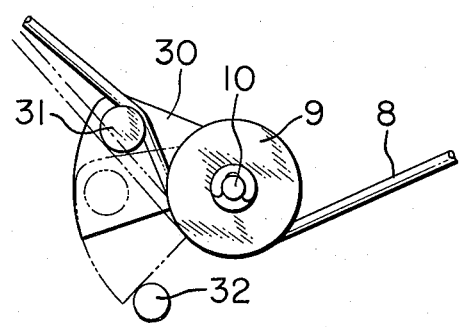
FIG. 3 is a front view illustrating the essential part of another embodiment of the device according to this invention.

FIG. 3 shows another modification of the band-form body adjusting means applicable to the device according to the invention. Reference numerals 8, 9 and 10 are the same elements as described above, 30 is a band-form body adjusting element of the same friction composition as the previously mentioned element 22, which is rotatively mounted to the driving pulley 9, and 31 is a pin planted on said element 30 which has the same function as the previously mentioned roller 26 and which is so formed as to supply a tension, which is required to remove the slackening, by pressing the belt 8 with its side, to the associated section in response to belt driving direction and magnitude of the driving pulley 9. The one shown in the drawing is formed to remove the slackening of the film only for one direction, for example only at time of rewinding the film and for the time of projecting the film, a stopper pin 32 is provided, which hits the end surface of the adjusting element 30 which is going to rotate counterclockwise in the drawing, interlocking with the driving pulley 9. This structure specially takes into account the high speed with which the film is rewound at the time of rewinding.

Of course it is possible to lengthen the adjusting element 30 symmetrically and to plant another pin on it in order to prevent the film from being slackened at the time of film projection.

Figure 4:
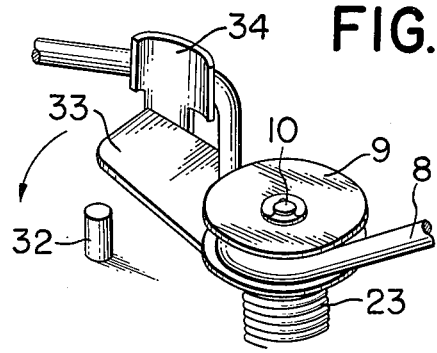
FIG. 4 is a oblique view illustrating the essential part of another embodiment of the device according to this invention.

FIG. 4 is another modification of the structure shown in FIG. 3. The members 8, 9, 10, 23 and 32 are the same as those described before, and 33 is another modification of the band-form body adjusting element which is mounted rotatively to the driving pulley 9 like the one described before. A belt-like body control piece 34 is provided on a portion of said adjusting element, and has the same function as the previously mentioned roller 26 and pin 31 do. Said control piece displaces the belt 8 as shown in the drawing at the time of film rewinding to remove the slackening of the film and, at the time of film projection, hits the stopper pin 32 to stop the rotation of the previously mentioned adjusting element in the direction of arrow mark.

It is of course possible to lengthen the member 33 and to privide the same control piece as 34 on the other end of said element 33 so that the slackening of the film at time of film projection can be removed. So far, the cases in which the reel spindle of a cineprojector is rotated by belt drive have been described.

Figure 6:
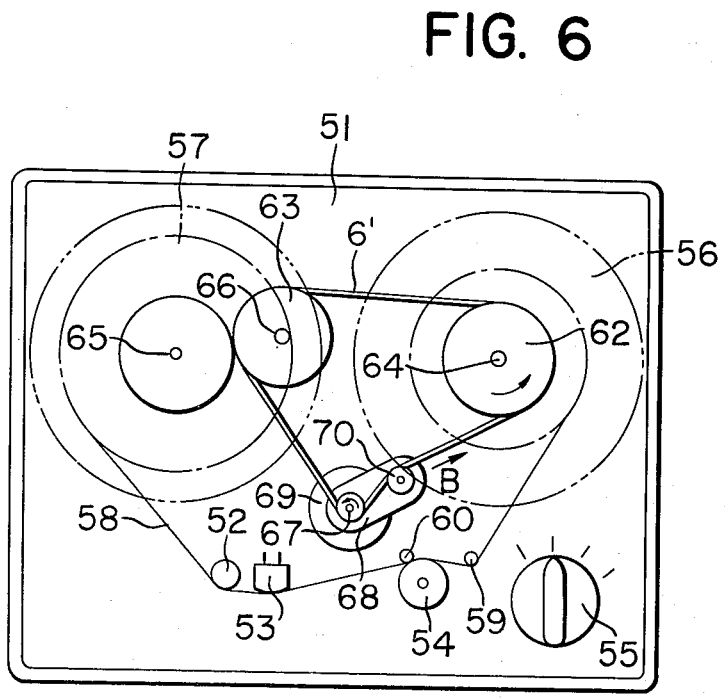
FIG. 6 is a schematic representation of one embodiment of tape recorder to which the device according to this invention is applicable.

FIG. 6 shows one embodiment of tape recorder to which the device according to this invention is applicable. In FIG. 6, 51 is the main unit or body of the tape recorder, 58 is a tape, 52 is a guide roller which guides said tape 58, 53 is the head, 54 is the capstan, 60 is the pinch roller, 59 is the tape guide roller, 62 and 64 are the driven pulleys supported by the shafts 64 and 66, 67 is the driving pulley, 61 is the belt to transmit the driving of said driving pulley 67 to the driven pulleys 63 and 62, 65 is the friction wheel which, by being pressed to said pulley 63, drives the tape supply reel 57 which receives the rotating and driving force of said pulley 63, and 68 is the band-form body adjusting member which, when the driving pulley 67 rotates as shown by the arrow mark B, rotates around the driving shaft 69 in the same direction as said driving pulley 67 by the friction mechanism not illustrated, and presses the belt 61 which is liable to slacken with the roller 70, and provides a tension sufficient to remove the slackening. In the embodiments given so far only the cases in which rotation is caused by a belt have been described.

Of course, it is possible to drive with an endless belt-like body such as chain. Moreover, the invented device can be applicable not only to cineprojectors but to the equipment such as the tape recorder in which a plural number of rotors are employed.

As described, this invention removes the slackening of a band-form body generated in rotating and driving a plural number of rotors by a single dirving means by providing a band-form body adjusting means which responses and relates to the direction and magnitude of the driving force of the driving means. Therefore, this invention is effective, with a very simple construction, to prevent the unstable operation accompanying vibration and noise which is liable to be caused in conventional cineprojectors etc. by the slackening of a band-form body such as a belt.

I claim:

1. A power transmission device for a motionpicture projector, and the like comprising in combination:
   a take-up reel spindle (6) which is rotatable to take part in film winding;
   a supply reel spindle (4) which is rotatable to take part in film feeding;
   driving means for operating said projector, said driving means having a driving shaft (9) which is rotated by the driving force of said driving means;
   a first pulley (9) which is coupled directly to said driving shaft and rotates integrally therewith;
   a second pulley which constantly rotates integrally with said take-up reel spindle;
   a third pulley (3) which constantly rotates integrally with said supply reel spindle;
   an endless band-form body (8) stretched between said first, second, and third pulleys in a manner to be friction-engaged with said respective pulleys, said endless band-form body receiving the driving force of said driving means through said first pulley when said driving means is driven, and transmitting said driving force to said second and third pulleys; and
   a band-form body adjusting means having a relation to respond to the directions and magnitude of the driving force of said endless band-form body caused by said first pulley, said adjusting means eliminating slack produced in the band-form body adjacent said first pulley which is driven by said driving shaft.

2. A device as set forth in claim 1, wherein the band-form body adjusting means is rotated and displaced in cooperation with the first pulley.

3. A device as set forth in claim 1, wherein the band-form body adjusting means is provided with a rotatable roller which hits and contacts the above-mentioned endless band-form body.

4. A device as set forth in claim 3, wherein the roller established on the band-form body adjusting means is mounted at the approximately symmetrical position to the above-mentioned first pulley.

5. A device as set forth in claim 1, wherein the band-form body adjusting means is arranged on the first pulley and rotated and displaced in cooperation with the rotation of said first pulley.

6. A power transmission device for a motion picture projector comprising:
   reversible driving means having a driving shaft (9) which is rotated by the driving force of said driving means;
   a take-up reel spindle (6) which is rotatable to take part in film winding;
   a supply reel spindle (4) which is rotatable to take part in film feeding;

a first pulley (9) which constantly rotates integrally with said driving shaft;
a second pulley (5) which constantly rotates integrally with said take-up reel spindle;
a third pulley (3) which constantly rotates integrally with said supply reel spindle;
an endless band-form body (8) stretched between said first, second and third pulleys in a manner to be friction-engaged with said respective pulleys, said endless band-form body receiving the driving force of said driving means through said first pulley, when said driving means is driven, and transmitting said driving force to said second and third pulleys; and
tension adjusting means for said band-form body, said adjusting means eliminating slack produced in the band-form body adjacent said first pulley which is driven by said driving shaft, said adjusting means being connected to said driving shaft through slip clutch means (23) and having a tension member (23,30,33,68) which is rotatable about the rotational axis of said first pulley and includes pressure contact means (26,28,31,34,70),
said tension member, when said driving shaft rotates, receiving a rotational force through said slip clutch means to rotate in the same direction as said driving shaft to adjust the tension of said band-form body.

7. The improvement according to claim 6, wherein said slip clutch means comprises a friction element.

8. The improvement according to claim 7, wherein said friction element comprises a spring.

9. The improvement according to claim 7, wherein said friction element comprises a spring and a felt.

10. The device according to claim 6, wherein said tension member comprises an elongated plate which is rotatably supported by said first pulley at an intermediate portion of the plate, said plate having at its opposite ends said pressure contact means.

11. The improvement according to claim 10, wherein said pressure contact means comprises a rotatable roller.

12. A power transmission device for a motion picture projector comprising:
reversible driving means having a driving shaft which rotates by the driving force of said means;
a take-up reel spindle which is rotatable to take part in film winding;
a supply reel spindle which is rotatable to take part in film feeding;
a first pulley which constantly rotates integrally with said driving shaft;
a second pulley which constantly rotates integrally with said take-up reel spindle;
a third pulley which constantly rotates integrally with said supply reel spindle;
an endless band-form body stretched between said first, second, and third pulleys in a manner to be friction-engaged with said respective pulleys, said endless band-form body receiving the driving force of said driving means through said first pulley, when said driving means is driven, and transmitting said driving force to said second and third pulleys; and
tension adjusting means for inwardly urging said band-form body in order to eliminate slack which is produced adjacent said first pulley driven by said driving shaft, when said band-form body runs around the pulleys, said adjusting means having an elongated tension member which is rotatably mounted at one end thereof to said first pulley through slip clutch means and includes at the other end of the tension member pressure contact means, said tension member being rotated through the slip clutch means in the same direction as said first pulley to urge said band-form body.

13. The improvement according to claim 12, wherein said slip clutch means comprises a friction element.

14. The improvement according to claim 13, wherein said friction element comprises a spring.

15. The improvement according to claim 13, wherein said friction element comprises a spring and a felt.

16. The improvement according to claim 12, wherein said pressure contact means comprises a rotatable roller.

* * * * *

Page - One

UNITED STATES PATENT OFFICE
CERTIFICATE OF CORRECTION

Patent No. 3,895,544          Dated July 22, 1975

Inventor(s) YUNIYOSHI SUZAKI

It is certified that error appears in the above-identified patent and that said Letters Patent are hereby corrected as shown below:

Column 1, line 10, "cineprojector" should read --a cineprojector--

Column 1, line 15, "cine-" should read --a cine- --;

Column 1, line 17, "belt" should read --a belt--;

Column 1, lines 19 and 20, "the method" should read --a method is generally employed--;

Column 1, line 21, delete "rotatable" and before "support" insert --rotatably--;

Column 1, line 23, "both spindles" should read --the spindles--;

Column 1, lines 25 and 26, delete ", is generally employed";

Column 1, line 27, "spindle" should read --spindle,--;

Column 1, line 28, "reel load" should read --the load reel--;

Column 1, line 28, "which reel" should read --which the reel--;

Column 1, line 29, "clutch" should read --clutch,--;

Column 1, line 32, "slackened" should read --slack--;

Column 1, lines 37 and 38, "will accompany with elongation" should read --will elongate--;

Column 2, line 15, "a" should read --an--;

Column 3, line 21, "can" should read --cam--;

UNITED STATES PATENT OFFICE
CERTIFICATE OF CORRECTION

Patent No. 3,895,544    Dated July 22, 1975

Inventor(s) YUNIYOSHI SUZAKI

It is certified that error appears in the above-identified patent and that said Letters Patent are hereby corrected as shown below:

Column 3, line 22, "broaden" should read --broadened--;

Column 3, lines 47 and 48, "rewinded" should read --rewound--;

Column 4, line 2, "rewinded" should read --rewound--;

Column 4, line 22, "dashes" should read --dashed--;

Column 4, line 53, "is tend" should read --tends--;

Column 4, line 61, "dashes" should read --dashed--;

Column 5, line 37, "privide" should read --provide--;

Column 6, line 3, "dirving" should read --driving--;

Column 6, lines 4 and 5, "responses" should read --responds--.

Signed and Sealed this sixteenth Day of December 1975

[SEAL]

Attest:

RUTH C. MASON
*Attesting Officer*

C. MARSHALL DANN
*Commissioner of Patents and Trademarks*